United States Patent [19]

Heckmann et al.

[11] Patent Number: 4,715,956

[45] Date of Patent: Dec. 29, 1987

[54] VIBRATING SCREEN CENTRIFUGE

[75] Inventors: Wolfgang Heckmann, Bergisch Gladbach; Wolfgang Epper, Bergheim, both of Fed. Rep. of Germany

[73] Assignee: Klöckner-Humboldt-Deutz Aktiengesellschaft, Fed. Rep. of Germany

[21] Appl. No.: 885,230

[22] Filed: Jul. 14, 1986

[30] Foreign Application Priority Data

Jul. 12, 1985 [DE] Fed. Rep. of Germany ....... 3524878

[51] Int. Cl.[4] .......... B01D 17/038

[52] U.S. Cl. .......... 210/363; 210/380.1; 210/541; 210/542

[58] Field of Search .......... 210/359, 360, 363, 365, 210/366, 367, 380.1, 384, 388, 389, 541, 542

[56] References Cited

U.S. PATENT DOCUMENTS 2,361,266 10/1944 Clark .......... 210/363
2,375,635 5/1945 Dyer .......... 210/363
4,141,837 2/1979 Heckmann et al. .......... 210/365

FOREIGN PATENT DOCUMENTS 1164326 2/1964 Fed. Rep. of Germany .

*Primary Examiner*—Frank Sever
*Attorney, Agent, or Firm*—Hill, Van Santen, Steadman & Simpson

[57] ABSTRACT

A first container for receiving fine-grained material to be dewatered with a concentric outer second container for receiving material from the first container and separating liquid, means for driving the containers in unison, circumferentially separated radial first and second plates connected to the first and second containers respectively, rubber blocks between the plates, and means for separately imparting vibration motion to the first and second containers with the vibrations being accommodated by the rubber blocks.

20 Claims, 6 Drawing Figures

VIBRATING SCREEN CENTRIFUGE

BACKGROUND OF THE INVENTION

The invention relates to a vibrating screen centrifuge for dewatering fine-grained material comprising two vibrating and rotating work masses which are placed in vibration with a phase shift of 180° in an axial direction.

Vibrating screen centrifuges are especially employed for dewatering fine-grained materials, such as coal, salts and sands. Single-mass and dual-mass sympathetic vibration systems comprising screen basket diameters up to about 1300 mm are known for this purpose. In the single-mass system, however, vibrating weights of about 1000 kg derive given a screen basket diameter of 1300 mm, these weights leading, for example, given 10 g axial acceleration, to bearing loads of about 10 t which must be absorbed both by the main bearings as well as by the unbalance bearings. An increase of the axial acceleration to about 20 g in order to achieve a higher throughput performance and a substantial improvement of the dewatering effect would, however, lead to a doubling of the reversing forces given this single-mass system and, thus, would involve a load of 20 t on the bearings which would not only lead to difficult to control bearing loads but would also lead to a heavy weight design of the claimed structural elements which could not be economically justified.

In comparison thereto, the dual-mass vibrating screen resonance system is not limited by the height of the bearing loads but by the values of acceleration of the counter-mass which have a direct relationship to the operating mass. Given, for example, a vibrating screen centrifuge whose operating mass amounts to 0.4 t, a counter-mass of more than 8 t is required in order to absorb an axial acceleration of 20 g of the operating mass in order to keep the foundation forces small (for example, below 1 g). This not only leads to a cumbersome and excessively heavy design of the vibrating screen centrifuge but is also connected to an unnecessarily high outlay for material and capital costs.

German AS No. 1 167 750 discloses a vibrating screen centrifuge comprising two vibrating and rotating operating masses which are placed in vibration with a phase shift of 180° in axial direction. The operating masses are thereby composed of two screen drums arranged following one another in axial direction having different angles of inclination which are vibrationally connected to one another via spring elements in an elastic fashion. Disadvantageous in this known vibrating screen centrifuge, however, is that the screen drums arranged following one another and vibrationally elastically connected to one another must be exactly mated to one another in terms of weight and the operation of these two operating masses can only be maintained at a specific frequency. Moreover, even slight modification in the quantity of material delivered, in the composition and/or in the dampness of the charging stock to be dewatered lead to considerable developments of unbalance in the vibrating and rotating operating masses which are transmitted onto the supporting bearings in the form of tilt moments and must be absorbed by these. This in turn requires a high-strength design of the bearings carrying the screen drums arranged in tandem, their useful life being extremely low due to the high stresses.

The object of the invention is to create a vibrating screen centrifuge for dewatering fine-grained material which, while avoiding all of the disadvantages recited above, enables a substantial increase in the separating effect and in the throughput performance in addition to enabling a compact and lightweight structure.

This object is achieved in that both operating masses are held on one and the same rotationally seated element by means of their vibrator springs, each of the two masses being separately in communication with a drive. Achieved in a very advantageous way by means of this inventive design of the vibrating screen centrifuge is that with the opposite vibration of the two operating masses, the mass forces in the final positions of the vibrations mutually cancel, so that mass forces are not transmitted onto the bearings of the drive masses either during the axial acceleration in the start-up phase or operation of the centrifuge. The axial and rotational acceleration of the operating masses can, therefore, be quite substantially increased in comparison to known vibrating screen centrifuges having a conventional design of the supporting bearings, thus leading to an improvement of the separating efficiency and to a noticeable increase in the throughput performance. The vibrating screen centrifuge of the invention is also completely unaffected by modifications in the quantity of material delivered, of the material composition and/or of the moisture content in the charging stock. Moreover, a particularly compact and lightweight structure of the vibrating screen centrifuge is achieved by means of these features of the invention.

In a further development of the invention, the vibrator springs connecting the two operating masses are fashioned as rubber members having sheet steel plates lying therebetween, these being arranged uniformly distributed over the circumference of the rotational drive shaft and being arranged in a radial direction. In comparison to steel springs, rubber springs are distinguished particularly by their simple, compact structure and high service life.

In accord with a further, advantageous development of the invention, the rubber members are rectangular and are mutually arranged uniformly distributed over the circumference by means of clamping wedges. With the assistance of the clamping wedges, not only can the rubber members be advantageously rigidly clamped relative to one another, but they can also be provided with a pre-stress necessary for optimum operation.

In accord with a further advantageous development of the invention, a double crank drive is provided as a vibrational drive, this being coupled via spring elements to the vibrating and rotating operating masses. The assistance of the double crank drive advantageously achieves a compulsory excitation of the two operating masses vibrating relative to one another. As a result of the coupling of the double crank drive to the vibrating and rotating operating masses via spring elements, the start-up of the vibrating screen centrifuge to the operating speed is quite substantially facilitated in a very advantageous way.

In a further development of the invention, a tumbling drive can be used as vibratory drive as warranted in a very advantageous way, this being coupled via elastic spring elements to the two vibrating and rotating operating masses. The tumbling drive is particularly distinguished by its extremely simple design and compact structure.

In an advantageous development of the invention, the two vibrating and rotating operating masses are composed of a materials distributor which is expanded funnel-like toward the top and of a screen basket which is inverted over the materials distributor at a distance and is expanded funnel-like in a downward direction. An especially stout and compact structure of the vibrating screen centrifuge is thus achieved.

In order to achieve optimum vibrating conditions, the two vibrating and rotating operating masses are fashioned about equal in weight in terms of their weight in accord with a further, preferred development of the invention.

Other objects, advantages and features will become more apparent with the teaching of the principles of the invention in connection with the disclosure of the preferred embodiment in the specification, claims and drawings, in which:

DESCRIPTION OF THE PREFERRED EMBODIMENTS

Figure 1:
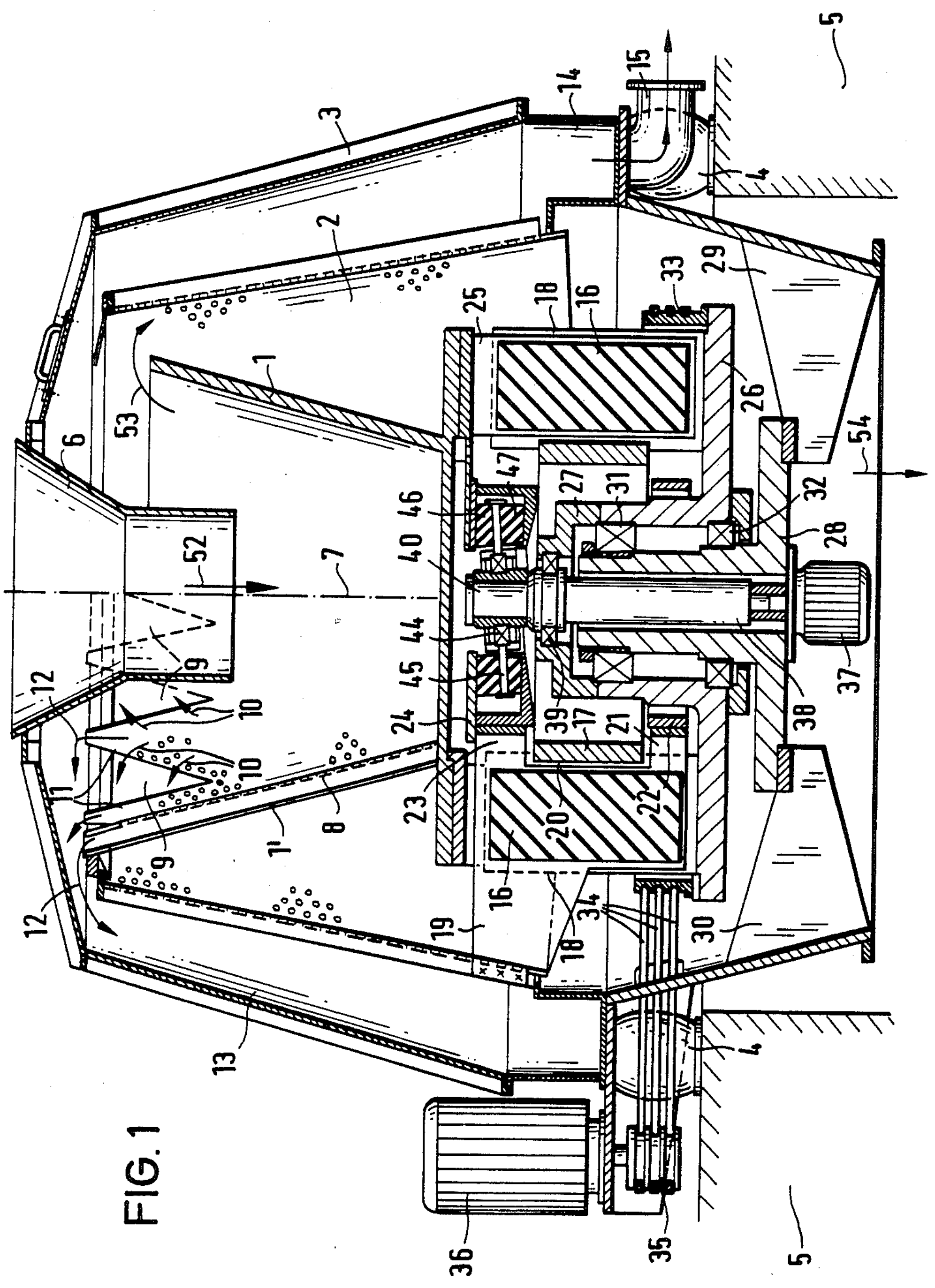
FIG. 1 illustrates a vibrating screen centrifuge comprising a wobble plate drive of the invention, in a longitudinal section.

As shown in FIG. 1, the two vibrating and rotating operating masses are composed of a materials distributor 1 expanded funnel-like toward the top and of a screen basket 2 which is inverted over the materials distributor 1 at a distance and is expanded funnel-like in downward direction. The materials distributor 1 and the screen basket 2 are situated in a housing 3 which is resiliently seated on rubber members 4 relative to the foundation 5. A materials delivery funnel 6 is arranged at the top in the housing 3, this funnel 6 discharging centrally into the materials distributor 1 from above. The materials distributor 1 can, as shown by way of example at the left-hand side of the broken line 7, also be very advantageously designed with a perforated jacket 8 at the inside, namely at a distance from the inside wall of the materials distributor 1'. The materials distributor 1' and the perforated jacket 8 are thereby provided at their upper edge with V-shaped cutouts 9 uniformly distributed over the circumference and of such length that they project beyond the upper edge of the screen basket 2. In this way, a preliminary dewatering of the charging stock to be dewatered can be advantageously achieved in the materials distributor 1', whereby the solid phase is discharged through the V-shaped coutouts 9 in arrow direction 10 and proceed onto the screen basket 2 for after-dewatering. The the liquid phase is discharged in arrow direction 12 via the segments 11 converging conically upward between V-shaped cutouts 9, being discharged into the annular space 13 situated between the screen basket 2 and the housing 3 from where it is discharged toward the outside via an annular channel 14 and pipe socket 15 together with the liquid phase emerging toward the outside through the openings in the screen basket 2.

The two operating masses fashioned as materials distributor 1 and screen basket 2 are connected to one another in vibrationally elastic fashion by rectangular rubber members 16 in accord with the invention. As particularly shown in FIG. 2, the rectangularly fashioned rubber members 16 are arranged in pairs around a ring 17, being arranged uniformly distributed over the circumference, and are rigidly clamped thereto in radial direction with the assistance of clamping wedges 18. Screws which are not shown in greater detail in the drawing are provided for clamping the rubber members 16 to the ring 17, the clamping wedges 18 being drawn-in in radial direction with the assistance of these screws. The centering of the rubber members 16 is also simultaneously carried out with the assistance of the clamping wedges 18. A plate 19 composed of sheet steel or some other material is clamped between every second pair of rubber members 16, the upper, outwardly projecting part of said plate 19 being rigidly connected to the screen basket 2 and carrying the latter. As shown in FIG. 1, the plate 19 is provided with a U-shaped recess at the inside, this recess surrounding the ring 17 at a distance. The lower, inwardly salient part 21 of the U-shaped recess 20 is connected to a clamp ring 22 which serves for centering the plates 19, whereas the upper, inwardly salient part 23 of the recess 20 is rigidly connected to the annular housing 24 of the tumbling drive.

Supporting plates 25 uniformly distributed over the circumference between the rubber members 16 are clamped between two respective plates 19 carrying the screen basket 2, these supporting plates 25 being rigidly connected to the materials distributor 1. In the present case, twelve pairs of rubber members 16 are provided for the vibrationally elastic clamping of the operating masses composed of the materials distributor 1 and of the screen basket 2, being provided by means of the supporting plates 19 and 25 uniformly distributed over the circumference of the ring 17 in alternation and respectively clamped between two rubber members 6. In order to avoid a slipping of the rubber members 16 relative to the supporting plates 19 and 25, it is expedient to let the rubber members 16 into the carrier plates 19 and 25 or to provide the surfaces of the supporting plates 19 and 25 with an appropriate profile. The rubber members 16 can be reliably retained in their position relative to the supporting plates 19 and 25 by means of applying angular webs to the supporting plates 19 and 25, these angular webs at least partially bounding the rubber members 16.

Figure 2:
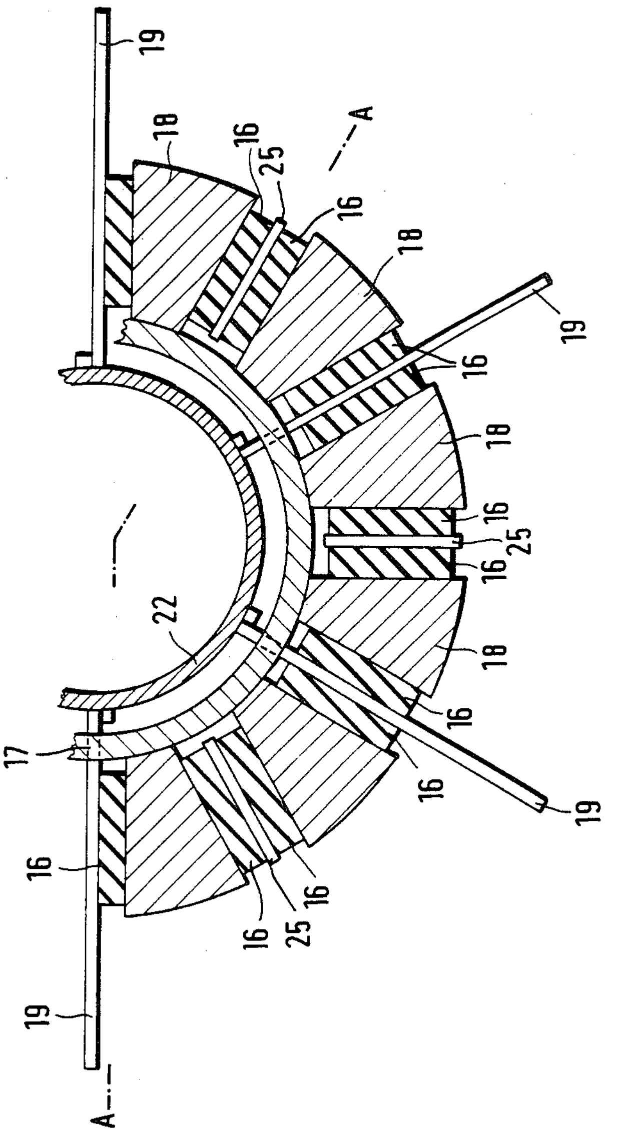
FIG. 2 is a plan view of a vibrating spring packet composed of rubber members having radially proceeding rubber members and wedge-like spacers in accordance with the invention.

The longitudinal section through the tension spring packet of the invention shown in FIG. 1 corresponds to the section A—A in FIG. 2 which is drawn through the rubber member 16 of the supporting plate 19 at the lefthand side and through the rubber member 16 of the supporting plate 25 at the righthand side.

Figure 3:
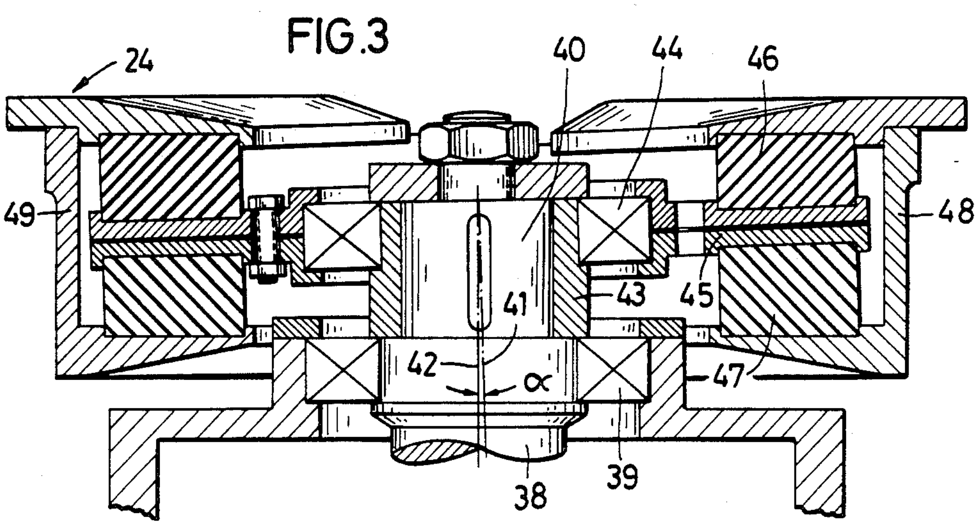
FIG. 3 illustrates the wobble plate of FIG. 1 clamped between rubber-shaped spring elements, shown enlarged.
Figure 4:
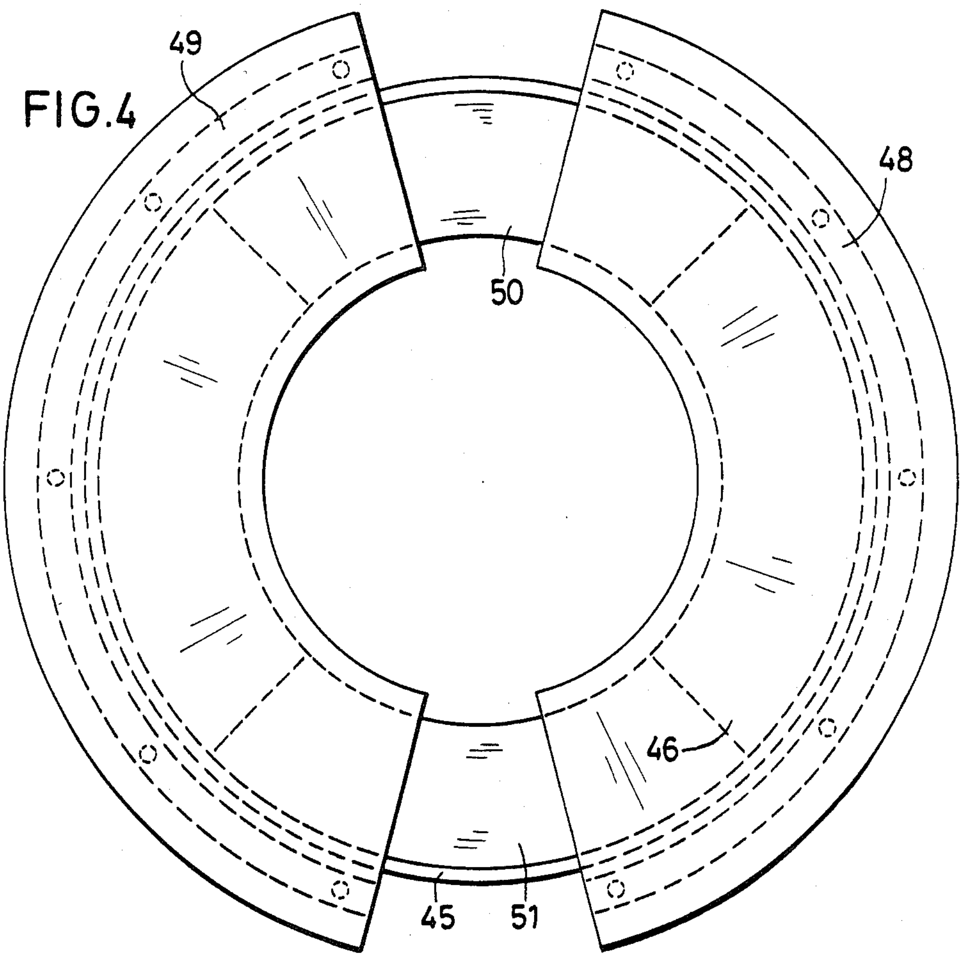
FIG. 4 is a plan view of the rubber-like spring elements of FIG. 3.

The operating masses (materials distributor 1 and screen basket 2) connected in vibrationally elastic fashion to one another via the rubber members 16 and supporting plates 19 and 25 are rigidly connected to the outwardly residing annular flange 26 of a rotational drive shaft 27 which is fashioned as a hollow shaft, being rigidly connected thereto via the clamping wedges 18. Screws which are not shown in greater detail in the drawing are provided for connecting the clamping wedges 18 to the annular flange 26 of the rotational drive shaft 27. The rotational drive shaft 27 is seated in rotationally mobile fashion on a stationary hub 28 which rests on consoles 29 and 30 rigidly arranged in the lower part of the housing 3. Two supporting bearings 31 and 32 are provided for seating the rotational drive shaft 27 on the hub 28. A V-belt pulley 33 is secured to the annular flange 26 of the rotational drive shaft 27, this pulley 33 being connected via V-belt 34 to the V-belt pulley 35 of a rotational drive motor 36 arranged outside at the housing 3 of the vibrating screen centrifuge. A motor 37 is centrally flanged to the hub 28 at the bottom, the drive shaft 38 thereof being conducted centrally up through the hub and being held with rotational mobility in a bearing 39 arranged in the rotational drive shaft 27. As particularly shown in FIG. 3, a shaft butt end 40 is attached to the upper end of the drive shaft 38, the longitudinal axis 41 of this end 40 being inclined by an angle $\alpha(2^\circ)$ relative to the longitudinal axis 42 of the drive shaft 38. A sleeve 43 is rigidly placed on the shaft butt end 40, this sleeve being in communication with a bipartite annular disk 45 via a four-point bearing 44. The annular disk 45 is rigidly clamped between the annular rubber springs 46, 47 arranged in the housing 24 and executes a tumbling motion with the shaft butt end 40 during operation of the drive shaft 38. As shown in FIG. 4, the housing 24 is composed of two annular segments 48 and 49 ending at a distance from one another which are rigidly connected to the supporting plates 10 and 25 separated from one another. Thus, the annular segment 48 is rigidly connected to the supporting plates 25 (shown in FIG. 1) of the materials distributor 1 at the righthand side and the annular segment 49 is rigidly connected to the supporting plates 19 (shown in FIG. 1) of the screen basket 2 at the lefthand side.

The annular rubber springs 46 and 47 are relatively soft, i.e., have a low spring constant and, moreover are provided with recesses 50 and 51 at their surface at the sides lying centrally opposite, as shown in FIG. 4. In this way, the acceleration of the vibrating screen centrifuge to the frequency of the operating masses vibrating relative to one another which is required in operation is advantageously substantially facilitated.

During operation of the vibrating screen centrifuge of the invention, the two operating masses comprised of the materials distributor 1 and screen basket 2 which are connected to one another in vibrationally elastic fashion by the rubber members 16 are placed in vibration in axial direction with the assistance of the drive motor 7 via the drive shaft 38 and the annular disk 45 clamped in the housing 24 between annular rubber springs 46, 47. The material to be dewatered is then centrally delivered to the vibrating screen centrifuge in arrow direction 52 from above by means of the materials delivery funnel 6, proceeding thence into the revolving materials distributor 1 which also vibrates in axial direction. From the materials distributor 1, the charging stock pre-accelerated therein which is uniformly distributed over the circumference is transferred in arrow direction 53 onto the screen basket which is likewise revolving and which vibrates in a direction opposite that of the materials distributor 1 and is subjected to a dewatering therein. The liquid present in the charging stock is hurled off toward the outside through the screen apertures of the screen basket 2 and is collected in the annular channel 14 when it is discharged toward the outside via the pipe socket 15. The solids slide down on the inside wall of the screen basket 2 and are discharged in arrow direction 54 through the lower housing part.

The inventive design and coupling of the two operating masses comprised of materials distributor 1 and screen basket 2 achieves the rather considerable advantage that the mass forces in the final positions of the vibrations mutually cancel in the opposite vibratory motion of the two operating masses, whereby the operating masses are not transmitted onto the supporting bearings 31 and 32 during either the axial acceleration in the start-up phase of the centrifuge or during operation of the centrifuge. In comparison to previously known vibrating screen centrifuges, simple bearings (for example, spherical roller bearings and cylindrical bearings) can therefore be employed as supporting bearings for the operating masses, these exhibiting an extremely long service life as a result of the low load. Moreover, the vibrating screen centrifuge constructed in accord with the invention also advantageously enables an axial acceleration of the operating masses from the previous 10 g to 20 g and more, and also enables a significant increase of the rotational acceleration of the operating masses, whereby, given normal design of the supporting bearings and of the remaining stressed parts of the centrifuge, not only is a considerable improvement of the separating efficiency achieved in comparison to heretofore known vibrating screen centrifuges but a rather considerable increase of the throughput performance is also achieved.

In order to achieve a preliminary dewatering of the charging stock in the materials distributor 1 of the vibrating screen centrifuge shown in FIG. 1, the materials distributor 1' shown at the lefthand side of the broken line 7 can be provided with a perforated jacket 8 and with V-shaped cutouts 9 through which the solid phase proceeds in arrow direction 10 onto the screen jacket 2 and the liquid phase proceeds via the segments 11 toward the outside into the annular space 13 in arrow direction 12, whence it is discharged toward the outside via the annular channel 14 and pipe socket 15.

Figure 5:
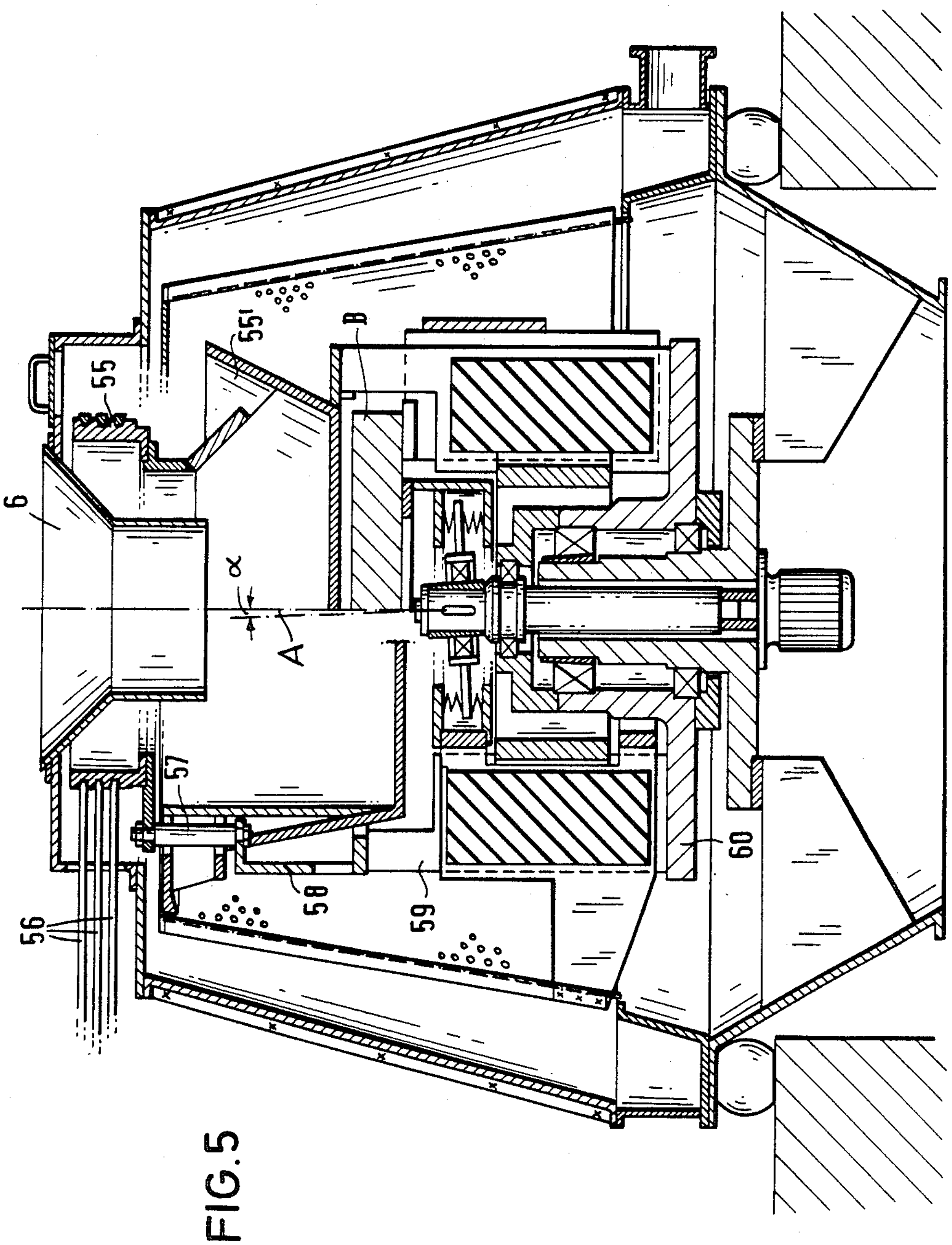
FIG. 5 illustrates a vibrating screen centrifuge comprising an upwardly displaced rotational drive of the invention, shown in longitudinal section.

As FIG. 5 shows, the vibrating screen centrifuge of the invention can, when warranted, also be advantageously provided with a top-disposed rotational drive. For this purpose, a V-belt pulley 55 encompassing the materials delivery funnel 6 at a distance is provided, this being in communication via V-belt 56 with a drive motor (not shown in detail in the drawing) secured to the housing 3. Given the execution shown to the left of the parting line A, the V-belt pulley 55 engages at the rotational drive shaft 60 via pins 57, annular members 58, clamping wedges 59 and rubber-elastic coupling. What is particularly simplified and facilitated by means of this top-disposed rotational drive shown in FIG. 5 is the replacement of the V-belt. In the embodiment shown to the left of the parting line A, the vibrational drive of the two operating masses ensues in the same way as in the vibrating screen centrifuge of the invention shown in FIG. 1. Given the execution shown to the right of the parting line A in FIG. 5, by contrast, a counter-mass B is required as vibrational mass, since the materials distributor 55' does not co-vibrate.

Figure 6:
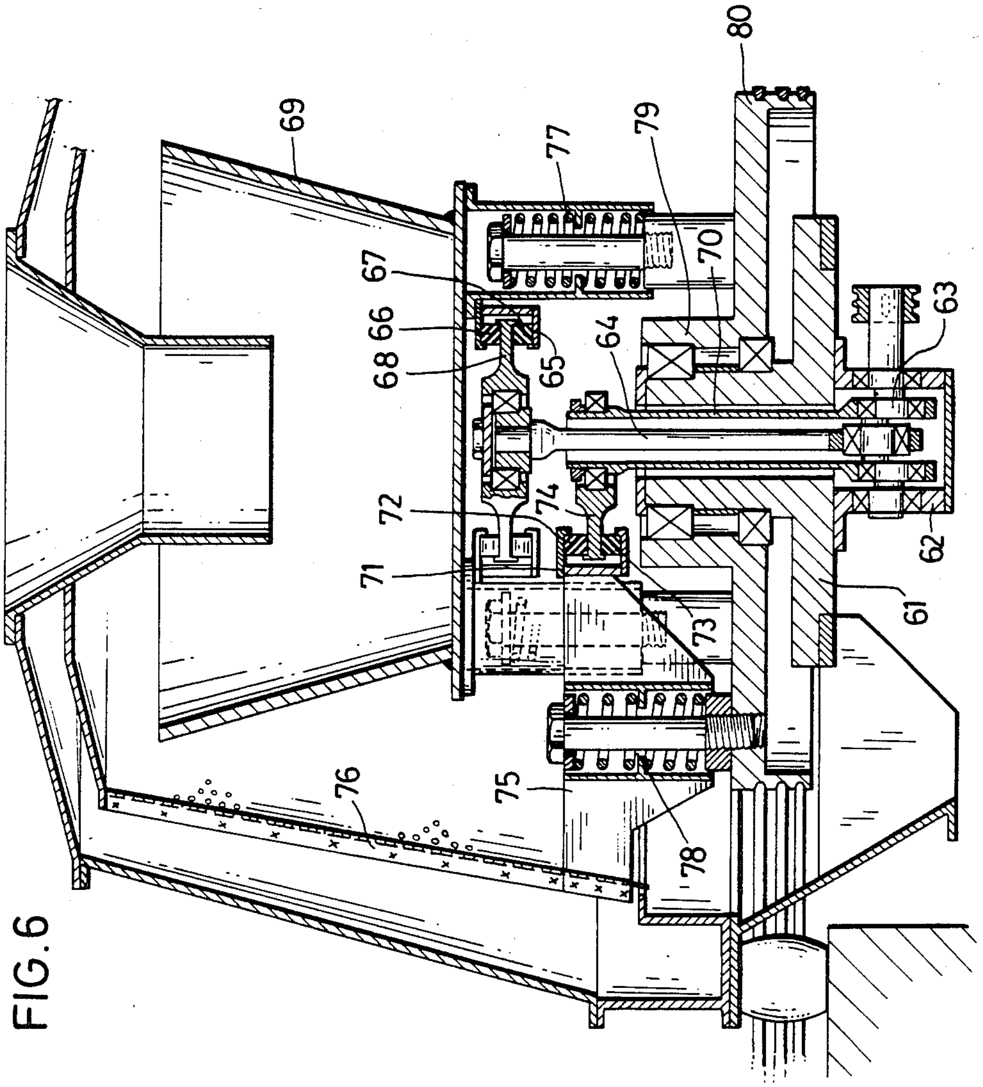
FIG. 6 illustrates a vibrating screen centrifuge comprising double crank drive and helical springs as coupling elements of the operating masses of the invention, shown in longitudinal section.

Finally, as shown in FIG. 6, the vibrating screen centrifuge of the invention can, when warranted, also be very advantageously equipped with a double crank drive as vibrational drive. This double crank drive is composed of a crank housing 62 rigidly connected to the stationary hub 61, the double crank shaft 63 being seated in this housing 62. A connecting rod 64 centrally attacks at the double crank shaft 63, this connecting rod 64 being vibrationally-elastically connected to the materials distributor 9 via an annular disk 68 clamped in a housing 65 between annular rubber springs 66 and 67. A hollow connecting rod 70 arranged offset by 180° relative to the connecting rod 64 also attacks at the crank shaft 63, this connecting rod 70 being in turn vibrationally-elastically connected to the screen basket 76 via an annular disk 74 clamped in a housing 71 between annular rubber springs 72, 73 and via a bracket 75. Coil springs 77 and 78 are thereby provided as vibrationally elastic coupling elements between the two operating masses fashioned as materials distributor 69 and screen basket 76, these coil springs 77 and 78 assuming the vibrationally elastic function of the operating masses vibrating relative to one another during operation in the same way as the rubber members 16 in the vibrating screen centrifuge of the invention shown in FIG. 1. It is also self-evident given the vibrating screen centrifuge of the invention shown in FIG. 6 that both the coil springs 77 and 78 connecting the two operating masses as well as the remaining, vibrationalelastic coupling elements are arranged uniformly distributed over the circumference of the rotational drive shaft 79 with the V-belt pulley 80 in order to avoid the formation of unbalances during operation of the centrifuge.

We claim as our invention:

1. A vibrating screen centrifuge for dewatering fine-grained material comprising in combination:

a first container for receiving material providing a first mass;

a second container for receiving material from the first for separating material from liquid providing a second mass;

means enabling mutual cancellation of mass forces sufficient to preclude transmission of mass forces on to the bearings of said centrifuge, including resilient connections between said masses permitting relative movement between containers limited by said connections;

means driving said masses in simultaneous rotation;

and means inducing vibration in said masses with a phase shift of 180° in an axial direction with said resilient connections accommdating vibrations of each mass relatively independent of the other.

2. A vibrating screen centrifuge for dewatering fine-grained material constructed in accordance with claim 1:

wherein said resilient connections include metal sheet plates extending radially and uniformly distributed around the axis of rotation of the masses with resilient members between the plates.

3. A vibrating screen centrifuge for dewatering fine-grained material constructed in accordance with claim 2:

wherein said resilient connections are in the form of rectangular rubber elements separated by circumferentially spaced clamping wedges.

4. A vibrating screen centrifuge for dewatering fine-grained material constructed in accordance with claim 1:

wherein said resilient connections are in the form of coil springs uniformly distributed around the circumference of the axis of the masses.

5. A vibrating screen centrifuge for dewatering fine-grained material constructed in accordance with claim 1:

wherein the means inducing vibrations is in the form of a double crank drive.

6. A vibrating screen centrifuge for dewatering fine-grained material constructed in accordance with claim 1:

wherein the means for inducing vibrations is in the form of a tumbling vibrational drive.

7. A vibrating screen centrifuge for dewatering fine-grained material constructed in accordance with claim 1:

wherein said first container is frusto-conical in shape expanding upwardly and the second container is frusto-conical in shape expanding downwardly.

8. A vibrating screen centrifuge for dewatering fine-grained material constructed in accordance with claim 1:

wherein said first and second masses are substantially the same weight.

9. A vibrating screen centrifuge for dewatering fine-grained material comprising in combination:

a first container for receiving material to be separated;

a second container coaxial with the first positioned for receiving the material to be separated and for separating liquid from the solids;

means for driving the containers in simutlaneous rotation;

means enabling mutual cancellation of mass forces sufficient to preclude transmission of mass forces on to the bearings of said centrifuge, including: resilient interconnecting means joining said containers permitting relative movement between containers limited by said resilient means;

and means for applying independent vibrational forces to said containers with the resilient means accommodating relative vibrational movement between said containers.

10. A vibrating screen centrifuge for dewatering fine-grained material constructed in aaccordance with claim 9:

wherein said resilient means are in the form of rubber blocks separated by plates with a first set of plates connected to the first container and a second set of plates connected to the second container.

11. A vibrating screen centrifuge for dewatering fine-grained material constructed in accordance with claim 10:

wherein said plates are uniformly separated and extend radially outwardly from the container axes.

12. A vibrating screen centrifuge for dewatering fine-grained material comprising in combination:

a first container having an upwardly outwardly flaring wall positioned for receiving material delivered thereto to be separated;

a second container coaxial with the first and having walls spaced outwardly therefrom flaring outwardly in a downward direction being perforate for separating liquid from materials;

a housing surrounding said second container for receiving liquid;

means for driving said containers in rotation with the material passing over the upper edge of the first container into the second;

a plurality of circumferentially spaced radially extending plates connected to the first container;

means enabling mutual cancellation of mass forces sufficient to preclude transmission of mass forces on to the bearings of said centrifuge; including means enabling mutual cancellation of mass forces sufficient to preclude transmission of mass forces on to the bearings of said centrifuge, including a plurality of second circumferentially spaced radially extending plates connected to the second container;

rubber blocks located between each of said first and second plates;

driving members located between each of said rubber blocks for imparting a driving rotational force to the containers through the blocks, said containers having relative movement limited by said blocks;

and means for inducing independent vibration of each of the containers relative to the other.

13. A vibrating screen centrifuge for dewatering fine-grained material constructed in accordance with claim 12:

wherein said vibration inducing means includes first and second plates respectively connected to said first and second containers with said plates connected to a drive positioned eccentric relative to the axis of the drive for the containers so that vibrational forces are imparted to the first and second containers.

14. A vibrating screen centrifuge for dewatering fine-grained material comprising in combination:

a separation container means for dewatering material contained therein;

two vibrating and rotating working masses;

means for driving said masses in rotation and in vibration with a vibrational phase shift of 180° in an axial direction;

a rotational drive shaft;

and means enabling mutual cancellation of mass forces sufficient to preclude transmission of mass forces on to the bearings of said centrifuge, including spring means interconnnecting said masses arranged uniformly distributed around the drive shaft axis.

15. A vibrating screen centrifuge for dewatering fine-grained material constructed in accordance with claim 14:

wherein said spring means includes radially extending steel plates with rubber members between each of said plates.

16. A vibrating screen centrifuge for dewatering fine-grained material constructed in accordance with claim 15:

wherein said rubber members are rectangular in shape and clamped by gripping wedges.

17. A vibrating screen centrifuge for dewatering fine-grained material constructed in accordance with claim 14:

wherein said spring means is in the form of helical springs.

18. A vibrating screen centrifuge for dewatering fine-grained material constructed in accordance with claim 14:

including a crank drive for driving said masses in vibration.

19. A vibrating screen centrifuge for dewatering fine-grained material constructed in accordance with claim 14:

wherein said driving means is in the form of a gyratory drive.

20. A vibrating screen centrifuge for dewatering fine-grained material constructed in accordance with claim 14:

wherein said masses are in the form of a product distributor which is frusto-conical in shape and faces upwardly and the second mass is in the form of a strainer basket surrounding the distributor and frusto-conical in shape and downwardly facing.

* * * * *